United States Patent [19]

Sasaki et al.

[11] 4,213,372
[45] Jul. 22, 1980

[54] ELECTRONIC TYPE MUSIC LEARNING AIDS

[75] Inventors: Takehiko Sasaki, Yamatokoriyama; Yuji Yashiro, Osaka, both of Japan

[73] Assignee: Sharp Kabushiki Kaisha, Osaka, Japan

[21] Appl. No.: 908,958

[22] Filed: May 24, 1978

[30] Foreign Application Priority Data

May 27, 1977 [JP] Japan .................................. 52-62307
Jun. 7, 1977 [JP] Japan .................................. 52-67457
Jun. 7, 1977 [JP] Japan .................................. 52-74383

[51] Int. Cl.² ........................................... G09B 15/04
[52] U.S. Cl. ..................................... 84/470 R; 84/484
[58] Field of Search ................... 84/470, 461, 464, 484

[56] References Cited

U.S. PATENT DOCUMENTS

| | | | |
|---|---|---|---|
| 3,771,406 | 11/1973 | Wheelwright | 84/470 |
| 3,905,267 | 9/1975 | Vincent | 84/464 |
| 4,012,979 | 3/1977 | Wemekamp | 84/464 |

Primary Examiner—L. T. Hix
Assistant Examiner—S. D. Schreyer
Attorney, Agent, or Firm—Birch, Stewart, Kolasch & Birch

[57] ABSTRACT

An electronic type music learning aid includes an input unit for the introduction of musical information such as duration and pitch of a tone, etc., in a digital fashion, a storage to and from which digital information can be written and read in sequence, a musical note display which provides a visual display of digital information read from the storage, and a sound generator which produces sounds in response to the digital information provided from the storage.

7 Claims, 1 Drawing Figure

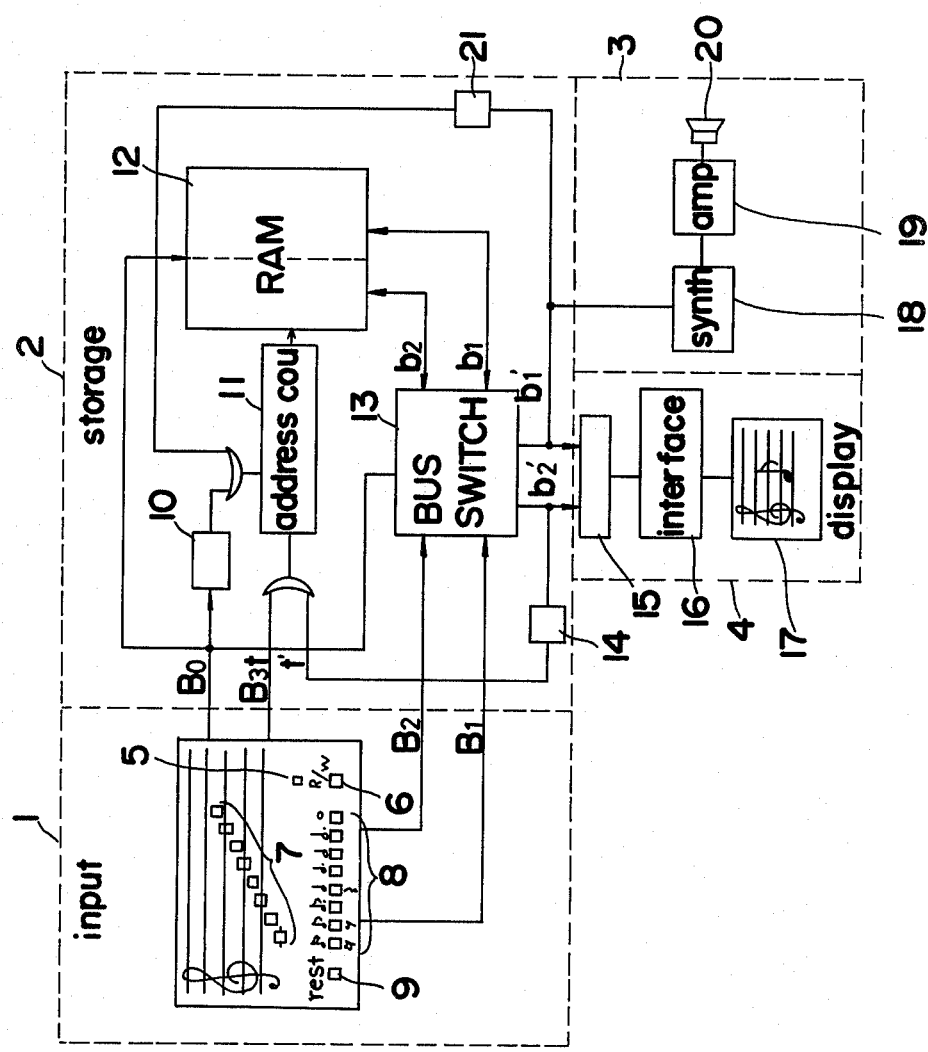

ELECTRONIC TYPE MUSIC LEARNING AIDS

BACKGROUND OF THE INVENTION

The present invention relates to an electronic type music learning aid which receives musical information as digital information and provides a visual display and audible sound of the introduced musical information, thereby confirming visually and audible a music tune written on staff notation.

A typical way of learning music (particularly, reading and comprehending a music tune) involves tracing consecutive music notes and reproducing a music tune through the use of an appropriate musical instrument. According to this method of learning, it will be able to reproduce the respective pitches correctly on the musical instrument, but as regards the respective durations the student will not know if he is reproducing the music tune correctly in agreement with the music notes because he must concentrate on his own accurate rhythm. The student, therefore, bears such burden and always feels doubtful about whether he is practicing the playing of the musical instrument in a correct way. Learning music is almost impossible where the respective pitches in the musical instrument are not good and the student cannot afford to have any musical instrument.

Therefore, it is an object of the present invention to provide an electronic type music learning aid which can overcome the prior art shortcoming.

The electronic type music learning aid of the present invention employs an input unit which enables musical information as regards musical notes indicating duration and pitch of a tone to be encoded in a digital format. When the input unit is manually operated corresponding to the musical notes written on a music sheet, the musical information is loaded into an electrically writable and readable storage. The contents of the storage are read out in sequence and sent to a sound generator and an image display, thereby playing the tone automatically and providing a visual display of the musical notes.

BRIEF DESCRIPTION OF THE DRAWINGS

Other objects and many of the attendant advantages of the present invention will be easily appreciated as the same becomes better understood by reference to the following detailed description which should be considered in conjunction with the accompanying drawings in which like reference numerals designate like parts throughout the figures thereof, and wherein:

A single FIGURE of the drawings illustrates a block diagram of one preferred form of the present invention.

DETAILED DESCRIPTION OF THE INVENTION

A basic scheme of the music learning aid of the present invention comprises an input unit 1 for the introduction of musical information, a storage 2, a sound generator 3 and a visual display 4. Details of implementations of the individual components and the correlations therebetween are described below.

The input unit 1 has a variety of input keys for the purpose of introducing musical information to be written into the storage 2 and of indicating whether musical information is to be written into or read out from the storage 2. Out of the various input keys, a write end key 5 is used when a series of musical note information are sequentially written and all the musical note information of a single musical note is completely written. A mode selection switch 6 is designed to select either a write mode or a read mode. According to the mode selected by the mode selection switch 6 either a write signal W or a read signal R is supplied via a mode selection bus $B_0$ to the storage 2. On an operating panel of the input unit 1 there is previously provided a staff notation where for example musical notes are indicated on a C major scale with a G clef. A family of pitch input keys of the push type or touch type is provided on the staff notation in a well known manner. Upon the depression of any pitch key, the corresponding pitch information on the staff notation is developed in the form of digital information and then supplied to a pitch bus $B_1$. In addition, there is provided a family of duration input keys 8 ranging from full length to a sixteenth length to introduce necessary duration information in a digital format. Depression of any duration key $8_j$ develops digital information as regards duration, which is sent to a duration data bus $B_2$. Information on the duration data bus $B_2$ and information on the pitch data bus $B_1$ form a set of musical note information. The family of duration input keys 8 is arranged for the introduction of not only duration information as regards muscial notes but also that as regards rests. A note/rest switch 9, therefore, is provided for deciding whether the duration information being introduced is relevant to musical notes or rests. As noted earlier, the plurality of keys are provided on the input unit and information concerning a music tone is input in the form of digital signals by depressing desired pitch keys and duration keys in the write mode.

In order to specify a storage area of a RAM (random access memory) in an order corresponding to the order of manual operation of the keys on the input unit, a clock generator not shown is provided within the input unit 1 and address clock signals t are supplied to a clock bus $B_3$ in response to the depression of various keys of the input unit 1.

The storage 2 which is connected to the input unit 1 via the mode selection bus $B_0$, the pitch data bus $B_1$, the duration data bus $B_2$ and the clock bus $B_3$, includes a one-shot generator 10, an address counter 11, the RAM 12, a data bus selection circuit 13, a timer circuit 14, etc. Under the circumstances that the write signal W is applied via the mode selection bus $B_0$, the RAM 12 is ready for the write mode. The write signal W establishes connection between the duration data bus $B_1$ and the duration data bus $B_2$ and a pitch data bus $b_1$ and a duration data bus $b_2$ via the data bus switch circuit 13 so that RAM 12 is ready for loading of the musical information. The write signal W on the mode selection bus $B_0$ is supplied to the one-shot generator 10 to form a pulse signal which in turn is supplied as a reset signal to the address counter 11, resetting the count of the counter 11.

Subsequent to this, a desired one $7_i$ of the pitch keys 7 and a desired one $8_j$ of the duration keys 8 are sequentially operated for the introduction of the first of the musical information. At the moment that the desired duration key $8_j$ is operated, the digital pitch information and the digital duration information are transferred into the RAM 12 via the pitch data buses $B_1$ and $b_1$ and the duration data buses $B_2$ and $b_2$, the musical information transferred being placed at the initial or first address. When the first of the musical note information has been loaded upon the depression of the duration input key $8_j$, the clock signal t is applied via the clock bus $B_3$ to the address counter 11. The outcome is that the counter 11 is "one" incremented and the count thereof is transferred into the RAM 12, specifying the next succeeding address. A series of the musical note information from the second one are loaded in the key operated order into their associated locations of the RAM 12. When the note/rest switch 9 is in the rest mode, a series of rest information can be loaded into the RAM 12 upon the depression of the duration input key 8. All the musical information, therefore, is written into the RAM 12 while the student manually operates the input unit 1 according to the sheet music. Immediately after the completion of the input procedure the end switch 5 is manually depressed to place an END code into the RAM 12.

If the mode selection switch 6 is turned to the read mode R, electric connection with the storage 2 is switched from the input unit 1 to the musical note display 4 and the sound generator 3. The pitch data bus $b_1'$ and the duration data bus $b_2'$ extending between the storage 2 and the musical note display 4 are respectively connected to the pitch data bus $b_1$ and the duration data bus $b_2$ within the storage 2.

The read mode signal R is supplied to the one-shot generator 10 to reset the address counter 11 so that the RAM 12 is ready for the read mode. Under these circumstance the first of the musical note information is derived from its location in the RAM 12 and supplied to the pitch data bus $b_1$ and the duration data bus $b_2$ and then to the pitch data bus $b_1'$ and the duration data bus $b_2'$. The digital information from the respective data buses $b_1'$ and $b_2'$ is sent to the display 17 via the decoder 15 and the interface 16. On the screen of the display 17 the respective pitches and durations of the musical notes are visually displayed. The display 17 is implemented with for example a cathode ray tube to provide a visual display of not only the staff notation similar to that on the operational panel of the input unit 1 but also the musical notes at the desired positions on the staff notation by display enabling signals applied via the interface 16.

The digital pitch information is further applied to the sound generator 3 wherein a frequency synthesizer 18 is provided to convert the digital pitch information into sound signals with the corresponding frequencies. The sound signals enable a loud speaker 20 via an amplifier 19 to produce audible sounds corresponding to the pitches. The audible sounds, released from the loud speaker 20 and corresponding to the information and the operation period of the loud speaker 20, correspond to the duration information. The timer circuit 14 is connected to the duration data bus $b_2'$. The digital duration information from the RAM 12 is supplied to the decoder 15 and to the timer circuit 14. The timer circuit 14 established the period corresponding to the duration information and helps the clock signal t' generate when the period corresponding to duration information lapses. The address counter 11 is "one" incremented upon the receipt of the clock signal t'. The count of the address counter 11 specifies the next succeeding location in the RAM 12. As the address counter advances, the timer circuit 14 is reset again and ready for the information on the duration data bus $b_2'$. The first note information is displayed on the note display 4 only for the period of time which corresponds to the duration data on the duration data bus $b_2$. Simultaneously, the sound of the corresponding pitch is released from the sound generator 3. After a given period of time has run, the second note information is read and a visual display and an audible sound is provided similarly. The same operation is repeated until the music tone information which is written in the RAM 12 is completely reproduced in the form of audible sounds and visual displays. Then, the end code is developed on the pitch data bus $b_1$ and sensed by the music tone end detector 21 connected to the pitch data bus $b_1'$. The end signal is supplied to reset the address counter 11 which specifies the initial address of the RAM 12.

While the present invention has been described in terms of the C major scale, symbols ♯ "sharp" or b "flat" may be entered by provision of another key.

It is obvious that the musical note display may be implemented with a liquid crystal display, a light emitting diode, and so on, in addition to the CRT. The musical notes can be displayed, note-to-note or syllable-to-syllable. It is also possible to display a plurality of musical notes at a time. The frequency synthesizer 18 may be replaced by a well known voice synthesizer.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic type music learning aid comprising:
   an input unit means for the introduction of musical information in a digital fashion, said input means including,
   a frame,
   a musical staff disposed on said frame,
   a plurality of pitch switch means for inputting the pitch of a musical note into said music learning aid, each of said pitch switch means corresponding to an individual musical note and respectively located on said musical staff means to indicate that individual note,
   a plurality of meter switch means disposed on said frame for inputting the duration of a musical note into said music learning aid, each of said meter switch means corresponding to a particular musical note duration, and
   wherein one of said pitch switch means and one of said meter switch means must be actuated to store the pitch and duration of a single musical note;
   a digital storage means for storing the musical information entered by said input unit means, said learning aid having a write operating mode and a read operating mode, said musical information being written into said digital storage means when in said write operating mode, said musical information being read from said storage means when said read operating mode; and
   a sound synthesizer means for producing sounds in accordance with the digital information provided from said storage during said read operation mode, said sound synthesizer means producing said sounds with a pitch corresponding to said specific pitch indicated on said input means.

2. An electronic type music learning aid comprising:
   an input unit means for introducing musical information into said music learning aid in a digital fashion, said input means including,
   a frame,
   a musical staff disposed on said frame, a plurality of pitch switch means for inputting the pitch of a musical note into said music learning aid, each of said pitch switch means corresponding to an individual musical note and respectively located on said musical staff means to indicate that individual note, a plurality of meter switch means disposed on said frame for inputting the duration of a musical note into said music learning aid, each of said meter switch means corresponding to a particular musical note duration, and wherein one of said pitch switch means and one of said meter switch means must be actuated to store the pitch and duration of a single musical note;

a storage means for storing the digital musical information, said musical information being written into said storage means in a sequence corresponding to the sequence of entry of said musical information into said music learning aid via said input means and in accordance with said pitch and said duration of generation representing said musical information entered via said input unit means;

said learning aid capable of reading said musical information from said storage means in a sequence corresponding to the sequence of entry of said musical information into said learning aid via said input means and in accordance with said pitch and said duration representing said musical information entered into said input unit means;

a musical note display means for providing a visual display of the musical digital information read from said storage means; and a sound generator means for producing sound in accordance with said musical information provided from said storage means, said sound generator means generating said sounds with a pitch and a duration of generation corresponding to said pitch and said duration of generation comprising said musical information and introduced into said music learning aid via said input unit means.

3. An electronic type music learning aid capable of audibly reproducing musical information entered into said music learning aid, comprising:

an input unit means for sequentially introducing said musical information into said learning aid in a digital fashion, said input means including;

a frame, a musical staff disposed on said frame, a plurality of pitch switch means for inputting the pitch of a musical note into said music learning aid, each of said pitch switch means corresponding to an individual musical note and respectively located on said musical staff means to indicate that individual note, a plurality of meter switch means disposed on said frame inputting the duration of a musical note into said music learning aid, each of said meter switch means corresponding to a particular musical note duration, and wherein one of said pitch switch means and one of said meter switch means must be acutated to store the pitch and duration of a single musical note;

an encoder means for converting said pitch information and said duration information entered via said input unit means into electric code signals;

a digital storage means responsive to said electric code signals for sequentially storing said musical information, said learning aid capable of writing said musical information into said storage means in a sequence corresponding to the sequence of introduction of said musical information into said learning aid via said input unit means and in accordance with the pitch and the duration indicated by one of said plurality of pitch key means and by one of said plurality of duration key means, said music learning aid capable of reading said musical information from said digital storage means in said sequence corresponding to the sequence of the introduction of said musical information into said learning aid via said input unit means and in accordance with the pitch and the duration indicated by one of said plurality of pitch key means and by one of said plurality of duration key means;

a decoder means for converting the digital musical information read from said digital storage means into sound signals; and a loud speaker means for reproducing said sound signals received from said decoder means in audible form, the audibly reproduced sound signal having a pitch corresponding to the pitch indicated by one of said plurality of pitch key means.

4. An electronic type music learning aid, in accordance with claim 3 wherein said loudspeaker means aubibly reproduces said sound signals in the form of a plurality of musical tones, each of said musical tones being audibly reproduced for a length of time corresponding to the length of time indicated by one of said plurality of duration key means.

5. An electronic type music learning aid, in accordance with claim 4 wherein said musical tones are displayed on a display means, said musical tones being displayed for a length of time corresponding to the length of time indicated by said one of said plurality of duration key means.

6. A musical keyboard input display for use in a music information storage system comprising:

a frame;

a musical staff disposed on said frame;

a plurality of pitch switch means for inputting the pitch of a musical note into said music information storage system, each of said pitch switch means corresponding to an individual musical note and respectively located on said musical staff means to indicate that individual note;

a plurality of meter switch means disposed on said frame for inputting the duration of a musical note into said music information storage system, each of said meter switch means corresponding to a particular musical note duration; and wherein one of said pitch switch means and one of said meter switch means must be actuated to store the pitch and duration of a single musical note.

7. The input display device of claim 6 further comprising:

rest switch means for inputting a metered pause into said music information storage system, said rest switch being used with one of said meter switch means to determine the length of said metered pause.

* * * * *